(12) United States Patent
van Thiel

(10) Patent No.: US 12,384,346 B2
(45) Date of Patent: Aug. 12, 2025

(54) ELECTROPNEUMATIC VALVE ASSEMBLY, ELECTROPNEUMATIC BRAKE SYSTEM, COMMERCIAL VEHICLE

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 602 days.

(21) Appl. No.: 17/850,277

(22) Filed: Jun. 27, 2022

(65) Prior Publication Data

US 2023/0010827 A1   Jan. 12, 2023

(30) Foreign Application Priority Data

Jul. 6, 2021 (DE) ............... 10 2021 117 460.0

(51) Int. Cl.
| | |
|---|---|
| *B60T 13/68* | (2006.01) |
| *B60T 8/36* | (2006.01) |
| *B60T 13/38* | (2006.01) |
| *B60T 15/02* | (2006.01) |
| *B60T 15/18* | (2006.01) |

(52) U.S. Cl.
CPC .............. *B60T 13/683* (2013.01); *B60T 8/36* (2013.01); *B60T 13/385* (2013.01); *B60T 15/027* (2013.01); *B60T 15/181* (2013.01)

(58) Field of Classification Search
None
See application file for complete search history.

(56) References Cited

U.S. PATENT DOCUMENTS

2020/0247381 A1   8/2020   Van Thiel

FOREIGN PATENT DOCUMENTS

| DE | 10 2015 008 377 A1 | 12/2016 | |
|---|---|---|---|
| DE | 10 2016 011 390 A1 | 3/2018 | |
| DE | 10 2017 009 307 A1 | 4/2019 | |
| WO | WO-2019034295 A1 * | 2/2019 | ............ B60T 13/385 |
| WO | WO-2021094116 A1 * | 5/2021 | ............ B60T 13/385 |
| WO | WO-2021110639 A1 * | 6/2021 | ............ B60T 13/263 |

OTHER PUBLICATIONS

WO-2019034295-A1—English Machine Translation (Year: 2019).*
WO-2021094116-A1—English Machine Translation (Year: 2021).*
WO-2021110639-A1—English Machine Translation (Year: 2021).*

* cited by examiner

*Primary Examiner* — Melanie Torres Williams
(74) *Attorney, Agent, or Firm* — Walter Ottesen, P.A.

(57) ABSTRACT

An electropneumatic valve assembly is provided for actuating a parking brake function of an electropneumatic brake system of a commercial vehicle. The assembly includes a parking brake valve unit which receives supply pressure via a supply pressure path. A pneumatically self-holding trailer valve unit is connected to the supply pressure path and has a pneumatically switchable trailer supply valve. The supply valve provides a trailer supply pressure to a trailer supply port in dependence on an electronic trailer brake signal. The parking brake valve unit has a pilot valve unit and a main valve unit and the pilot valve unit outputs a parking brake control pressure at the main valve unit. The main valve unit outputs a parking brake pressure at a spring brake port. The valve assembly has a compensation valve to maintain the parking brake control pressure outputted at the main valve unit to compensate for valve leakage.

15 Claims, 4 Drawing Sheets

ELECTROPNEUMATIC VALVE ASSEMBLY, ELECTROPNEUMATIC BRAKE SYSTEM, COMMERCIAL VEHICLE

CROSS REFERENCE TO RELATED APPLICATION

This application claims priority of German patent application no. 10 2021 117 460.0, filed Jul. 6, 2021, the entire content of which is incorporated herein by reference.

TECHNICAL FIELD

The disclosure relates to an electropneumatic valve assembly. The disclosure also relates to an electropneumatic brake system having the electropneumatic valve assembly and to a commercial vehicle having the electropneumatic brake system.

BACKGROUND

In modern electropneumatic brake systems, in particular in parking brake systems, it is important that the brake system behaves reliably. This applies both to normal operation of the commercial vehicle and also in the event of a fault in the commercial vehicle, in particular in the electropneumatic brake system.

In particular in the event of leakages in the electropneumatic brake system, there is a risk that unintentional and/or uncontrolled switching operations will occur.

DE 10 2016 011 390 A1 describes an electropneumatic parking brake valve device with three pneumatic ports, which form a compressed air input for connection to a compressed air supply, a compressed air output for connection to the spring parking brake, and an air release port, wherein there is provided in the electropneumatic parking brake valve device, between a control volume and a compressed air input and/or an air release port, a bypass line having a bypass valve device which is pneumatically actuated by the control volume for connecting or separating the control volume to or from a port, and in at least one of the steady-state positions the bypass valve device is actuated by the control volume such that it at least partially bypasses an inlet and outlet valve device for admitting air to the control volume and connects the control volume to the port.

On the one hand, a leakage can, for example, lead to an uncontrolled pressure drop in a pilot branch of a main valve unit in the air admission state, but on the other hand it can also lead to an uncontrolled pressure build-up in the pilot branch in an air release state. Leakages can occur in particular in the case of articulated trucks, where the pneumatic system of a commercial vehicle is extended via at least one separable pneumatic connection to a trailer.

Electropneumatic brake systems are in need of further improvement, in particular with regard to reliable behavior and a reduced risk of uncontrolled operation. This applies in particular to electropneumatic parking brake systems in commercial vehicles and in particular in articulated trucks.

It is therefore desirable to improve the functioning of the electropneumatic valve assembly for an electropneumatic brake system.

SUMMARY

An object of the disclosure is to provide an improved electropneumatic valve assembly. In particular, there is to be provided an electropneumatic valve assembly which even in the event of leakages ensures reliable, controlled behavior of a parking brake function of the electropneumatic brake system.

The disclosure proceeds from an electropneumatic valve assembly for actuating a parking brake function of an electropneumatic brake system of a commercial vehicle, having a parking brake valve unit which receives supply pressure from at least one pressure supply via a supply pressure path, and having a pneumatically self-holding trailer valve unit which is connected to the supply pressure path for receiving the supply pressure and has a pneumatically switchable trailer supply valve which provides a trailer supply pressure to a trailer supply port in dependence on an electronic trailer brake signal, wherein the parking brake valve unit has a pilot valve unit and a main valve unit, and the pilot valve unit is provided to output a parking brake control pressure at the main valve unit, wherein the main valve unit is configured to output a parking brake pressure at least at one spring brake port in dependence on the received parking brake control pressure.

According to the disclosure, it is provided in the electropneumatic valve assembly according to the first aspect of the disclosure that the electropneumatic valve assembly has a compensation valve which is provided to maintain the parking brake control pressure outputted at the main valve unit by the pilot valve unit and thus to compensate at least partially for a leakage of the pilot valve unit and/or the main valve unit.

Via the compensation valve according to the disclosure, leakages which occur in the pilot valve unit and/or the main valve unit can advantageously be compensated for. This is advantageously made possible by a controllable pneumatic connection to the at least one pressure supply or to the air release port, which can be established by the compensation valve. Because the trailer valve unit is pneumatically connected to the supply pressure path for receiving the supply pressure, a trailer that is pneumatically connected to the commercial vehicle is advantageously included in the compensation and thus likewise secured.

In an advantageous further embodiment of the disclosure it is provided that the compensation valve is configured to compensate at least partially for a leakage of the pilot valve unit in the air admission state and in the air release state.

The invention is developed further in that the compensation valve is in the form of a 3/2-way valve and has a first compensation valve port which receives supply pressure, a second compensation valve port at which the parking brake control pressure or a pressure derived therefrom can be present, and a third compensation valve port which is connected to an air outlet, wherein in a first switch position the second compensation valve port is connected to the third compensation valve port, and in a second switch position the first compensation valve port is connected to the second compensation valve port.

It is advantageously provided that the first compensation valve port is connected to the supply pressure path. It is advantageously provided that the second compensation valve port is connected to a line which carries the parking brake control pressure, in particular a control line. By switching into the second switch position, a pneumatic connection between a control line and an air release port can advantageously be established.

In an advantageous further embodiment of the disclosure it is provided that the compensation valve is biased into the first switch position by spring loading and switches into the second switch position in the actuated state. In particular, the compensation valve has a return spring.

The invention is developed further in that the compensation valve is in the form of a pneumatically switchable valve which is switchable via a compensation valve control pressure. The compensation valve control pressure is advantageously provided at a compensation valve control port.

In an advantageous further embodiment of the disclosure it is provided that the compensation valve is configured to switch when the compensation valve control pressure exceeds a compensation valve threshold value. The compensation valve is advantageously configured, in particular by the configuration of a return spring, to switch into the second switch position when the compensation valve threshold value is exceeded. The compensation valve threshold value is advantageously between 0.241 MPa (35 psi) and 0.379 MPa (55 psi), preferably between 0.276 MPa (40 psi) and 0.345 MPa (50 psi), particularly preferably 0.310 MPa (45 psi).

In an advantageous further embodiment of the disclosure it is provided that the compensation valve control pressure is a pressure that is present or outputted at the second compensation valve port, whereby pneumatic self-holding for the compensation valve is implemented. It is advantageously provided that the second compensation valve port is pneumatically connected to the compensation valve control port via a compensation control path.

It is further achieved via the compensating pneumatic connection to the at least one pressure supply that can be established by the compensation valve that a pilot pressure of the main valve unit can be coupled with the supply pressure in the at least one pressure supply. Via the pneumatic connection between the supply pressure path and the trailer valve unit, the above-described pneumatic coupling can also comprise a pneumatic system of a trailer connected to the trailer valve unit. If the compensation valve control pressure falls below a compensation valve threshold value, the self-holding nature leads to switching of the compensation valve into the first switch position, whereby the at least one parking brake cylinder engages reliably and reproducibly, namely when the compensation valve threshold value is not reached.

It is also advantageously achieved via the compensation control path that, in the event of pumping down or a purposive pressure drop in at least one, in particular all, of the compressed air supplies and an associated fall in the compensation valve control pressure below a compensation valve threshold value, switching into the first switch position takes place in order to release air from the control line and thus activate a parking brake function.

In an advantageous further embodiment of the disclosure it is provided that the compensation valve control pressure is a parking brake pressure that is present or outputted at the spring brake port. In such a further embodiment, the compensation valve is thus switchable in dependence on the outputted parking brake pressure. It is advantageously provided that the spring brake port is pneumatically connected to the compensation valve control port via a compensation control path in the form of a feedback path.

In an advantageous further embodiment of the disclosure it is provided that the compensation valve is throttled, preferably such that the connection of the first compensation valve port to the second compensation valve port and/or the connection of the second compensation valve port to the third compensation valve port is in each case throttled. In particular, the compensation valve has a first throttle for throttling the pneumatic connection between the first compensation valve port and the second compensation valve port in the second switch position. In particular, the compensation valve has a second throttle for throttling the pneumatic connection between the second compensation valve port and the third compensation valve port in the first switch position. In other further embodiments, a common throttle can be provided, which is independent of the switch position of the compensation valve and is connected upstream or downstream of the compensation valve. Such a common throttle can advantageously be arranged between the second compensation valve port and a branch node for the compensation control path.

The invention is developed further in that the compensation valve is arranged in a compensation path, wherein the compensation path pneumatically connects the supply pressure path to a control line, and the control line, for providing the parking brake control pressure, is pneumatically connected to the main valve unit, preferably to a control port of the main valve unit.

In an advantageous further embodiment of the disclosure there is provided a deactivation valve which is arranged in the compensation path and has a first deactivation valve port and a second deactivation valve port and which, in dependence on a deactivation signal, can be switched from an activation position which pneumatically connects the first deactivation valve port and the second deactivation valve port into a deactivation position which pneumatically separates the first deactivation valve port and the second deactivation valve port.

The deactivation valve is advantageously in the form of a 2/2-way valve, preferably in the form of a 2/2-way solenoid valve. The deactivation valve is advantageously arranged between the compensation valve and the control line. Via a deactivation valve, the pneumatic connection established by the compensation valve can advantageously be switchable and in particular can be blocked for a short time. This is advantageous if precisely timed actuation, in particular via the pilot valve unit, is required. Switching into the deactivation position prevents a pressure drop via the compensation valve, which improves the control quality in particular in the case of an actuation of the main valve unit in a stepped manner and/or with high temporal resolution via the control line. Switching into the deactivation position can advantageously also reduce air consumption.

In an advantageous further embodiment of the disclosure, a trailer pilot unit is provided for providing a trailer control pressure in dependence on the electronic trailer brake signal, wherein the trailer supply valve is pneumatically actuatable in dependence on the trailer control pressure.

Within the context of a preferred further embodiment there is provided an emergency release port which can be pneumatically connected to the control port in order to provide an emergency release pressure. Via an emergency release port, the parking brake function, in particular engaged spring brake cylinders, can advantageously be released even if the supply pressure has fallen below the first threshold value. In particular, the emergency release port can be used with a further compressed air source which is independent of the compressed air supply that supplies the parking brake function. Such a compressed air source can in particular be a compressed air source that supplies the service brake system. Via the compensation valve, with a one-time inputting of an emergency release pressure, the compensation valve can advantageously be switched into the second switch position for admitting air permanently, and thus in particular independently of the emergency release pressure, to the spring brake port and thus the parking brake function.

Within the context of a further embodiment it is provided that there is arranged at the emergency release port a check valve which opens in the direction of the control port and closes in the opposite direction.

The invention is advantageously developed further by an anti-compound port which can be pneumatically connected to the control port in order to provide an additional parking brake pressure.

The invention is advantageously developed further by a selection valve having a first selection valve port which is connected to the anti-compound port, a second selection valve port which is connected to the emergency release port, and a third selection valve port which is connected to the control port, wherein the selection valve is configured to connect to the third selection valve port the selection valve port, from the first selection valve port and the second selection valve port, at which the higher pressure is present.

In a second aspect, the disclosure further provides, for achieving the object, an electropneumatic brake system for a commercial vehicle, having an electropneumatic valve assembly according to the first aspect of the disclosure, at least a first compressed air supply, at least one spring brake cylinder which is pneumatically connected to the at least one spring brake port for receiving the parking brake pressure, and an electronic control unit, configured to provide at least one electronic parking brake signal.

In a third aspect, the disclosure further provides, for achieving the object, a commercial vehicle, having an electropneumatic valve assembly according to the first aspect of the disclosure and/or an electropneumatic brake system according to the second aspect of the disclosure.

BRIEF DESCRIPTION OF THE DRAWINGS

The invention will now be described with reference to the drawings wherein.

DESCRIPTION OF THE PREFERRED EMBODIMENTS

Figure 1:
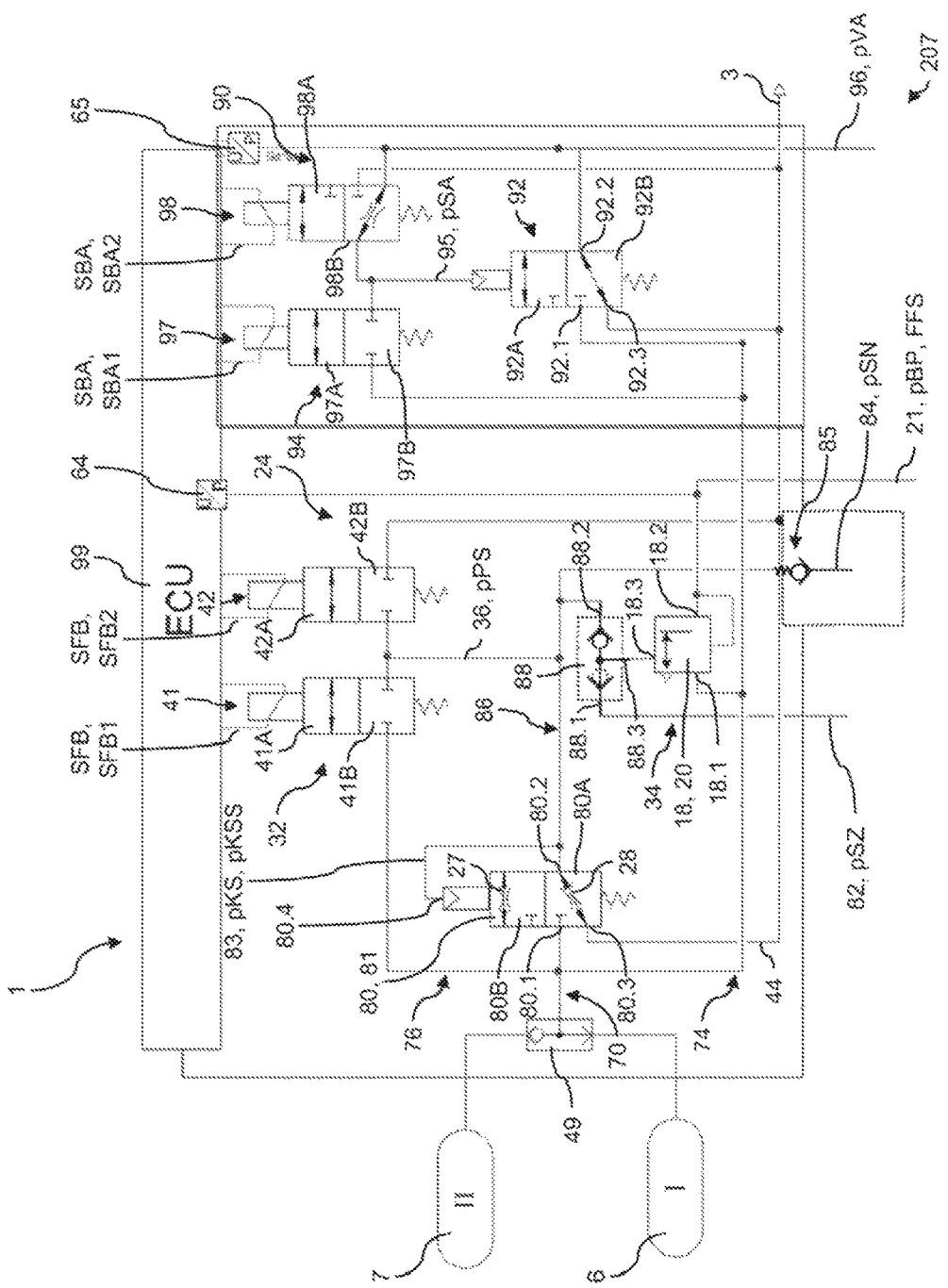
FIG. 1 shows a first embodiment of an electropneumatic valve assembly according to the disclosure.

FIG. 1 shows a first embodiment of an electropneumatic valve assembly 1 according to the concept of the invention. The electropneumatic valve assembly 1 has a parking brake valve unit 24 with a supply pressure path 70. The parking brake valve unit 24 is configured to output a parking brake pressure pBP at least at one spring brake port 21 in dependence on an electronic parking brake signal SFB.

The supply pressure path 70 is pneumatically connected via a supply shuttle valve 49 to a first compressed air supply 6 and a second compressed air supply 7 in order to receive a supply pressure pV. The supply shuttle valve 49 is in the form of a select-high shuttle valve, so that, of the first compressed air supply 6 and the second compressed air supply 7, the compressed air supply in which the higher supply pressure pV prevails is connected to the supply pressure path 70 and the respective other compressed air supply 6, 7 is closed.

The supply pressure path 70 is divided into a supply branch 74, a control branch 76 and a compensation path 86.

The compensation path 86 pneumatically connects the supply pressure path 70 to a control line 36.

A compensation valve 80 is arranged in the compensation path 86. The compensation valve 80 is in the form of a 3/2-way valve 81. The compensation valve 80 has a first compensation valve port 80.1, which is pneumatically connected to the supply pressure path 70. The compensation valve 80 has a second compensation valve port 80.2, which is pneumatically connected to the compensation path 86. The compensation valve 80 has a third compensation valve port 80.3, which is pneumatically connected to an air release line 44. The air release line 44 is connected to an air release port 3, which releases air into the environment.

The compensation valve 80 has a compensation valve control port 80.4, which is pneumatically connected via a compensation control path 83 to the second compensation valve port 80.2. Pneumatic self-holding is preferably implemented via the compensation control path 83. Via the compensation control path 83, a pressure present at the second compensation valve port 80.2, in particular a parking brake control pressure pPS, is provided at the compensation valve control port 80.4.

In a second switch position 80B of the compensation valve 80, the first compensation valve port 80.1 is pneumatically connected to the second compensation valve port 80.2, and the third compensation valve port 80.3 is preferably closed. In the second switch position 80B, the supply pressure path 70 is thus pneumatically connected to the compensation path 86 and thus to the control line 36. In a first switch position 80A of the compensation valve 80, the second compensation valve port 80.2 is pneumatically connected to the third compensation valve port 80.3, and the first compensation valve port 80.1 is preferably closed. In the first switch position 80A, the compensation path 86 is thus connected to the air release line 44 and the control line 36 is thus pneumatically connected to the air release port 3.

In the present case, the compensation valve 80 has a first throttle 27 between the first compensation valve port 80.1 and the second compensation valve port 80.2. The first throttle 27 advantageously has a nominal width which is smaller compared to the compensation path 86 and/or the supply pressure path 70. In the present case, the compensation valve 80 has a second throttle 28 between the second compensation valve port 80.2 and the third compensation valve port 80.3. The second throttle 28 advantageously has a nominal width which is smaller compared to the compensation path 86 and/or the air release line 44.

In the present case, the parking brake valve unit 24 has a main valve unit 34. The main valve unit 34 comprises a pilot valve unit 32 and a pneumatically actuated main valve 18. The pilot valve unit 32 is configured to provide a parking brake control pressure pPS at a control port 18.3 of the pneumatically actuated main valve 18 in dependence on the electronic parking brake signal SFB. The pneumatically actuated main valve 18 is configured to output the parking brake pressure pBP, which is provided at the spring brake port 21, in dependence on this parking brake control pressure pPS at a main port 18.2. The pneumatically actuated main valve 18 is in the present case in the form of a relay valve 20.

The pilot valve unit 32 has a first pilot valve 41 and a second pilot valve 42, which are each in the form of 2/2-way solenoid valves. Via the first pilot valve 41, the supply pressure pV, in an open position 41A, can be provided from the supply pressure path 70 as parking brake control pressure pPS at the control line 36. The control line 36 is arranged between the first pilot valve 41 and the second pilot valve 42 and is pneumatically connected or connectable to the control port 18.3 of the main valve 18.

By switching the first pilot valve 41 into a closed position 41B, the pilot pressure pSV can be trapped or held in the control line 36, in particular at the control port 18.3, for permanent actuation. The second pilot valve 42 is thereby likewise in a closed position 42B. Corresponding to the construction of the pilot valve unit 32 with a first pilot valve 41 and a second pilot valve 42, the electronic parking brake signal SFB comprises a first electronic parking brake signal SFB1 for actuating the first pilot valve 41 and a second electronic parking brake signal SFB2 for actuating the second pilot valve 42. By switching the second pilot valve 42 into an open position 42A, the control line 36 can be pneumatically connected to the air release line 44 for releasing air from the control port 18.3.

The control line 36 can additionally be pneumatically connected to an emergency release port 84 and/or to an anti-compound port 82. Via the emergency release port 84, an emergency release pressure pSN can be provided at the control line 36 and in particular at the control port 18.3, in order to output a parking brake pressure pBP at the spring brake port 21 independently of the pilot valve unit 32. In particular, via the emergency release port 84, movability of the commercial vehicle 201 can be established in a controlled manner in the event of a failure of the brake system 202 or a similar fault which leads to engagement of the parking brake function FFS. There is advantageously arranged at the emergency release port 84 a check valve 85 which opens in the direction of the control port 18.3 and closes in the opposite direction. Via the check valve 85, an uncontrolled escape of the parking brake control pressure pPS via the emergency release port 84 can advantageously be avoided. Via the check valve 85, a one-time inputted emergency release pressure pSN can also permanently be trapped or held in the control line 36 for permanently admitting air to the spring brake port 21 and thus for releasing at least one parking brake cylinder.

Via the anti-compound port 82, an additional parking brake pressure pSZ can be provided at the control line 36 and in particular at the control port 18.3 in order to output a parking brake pressure pBP at the spring brake port 21 independently of the pilot valve unit 32. In particular, the additional parking brake pressure pSZ can be provided by a service brake function (not shown here), in order to implement an anti-compound function.

The electropneumatic valve assembly 1 further advantageously has a selection valve 88 which is arranged in the control line 36 and is in the form of a select-high valve. The selection valve 88 has a first selection valve port 88.1 which is connected to the anti-compound port 82, a second selection valve port 88.2 which is connected to the emergency release port 84, and a third selection valve port 88.3 which is connected to the control port 18.3. The selection valve 88 is configured to connect to the third selection valve port 88.3 the selection valve port, from the first selection valve port 88.1 and the second selection valve port 88.2, at which the higher pressure is present.

The electropneumatic valve assembly 1 has a first pressure sensor 64, which is pneumatically connected to the spring brake port 21, for measuring the parking brake pressure pBP.

The electropneumatic valve assembly 1 has a trailer valve unit 90 for supplying a trailer 207 of the commercial vehicle 201 with a trailer supply pressure pVA. The trailer valve unit 90 has a trailer supply valve 92, which in the present case is in the form of a pneumatic 3/2-way valve and to which a trailer control pressure pSA can be applied via a trailer control port 92.4 for the purpose of switching.

The trailer supply valve 92 has a first trailer supply valve port 92.1, which is pneumatically connected to the supply pressure path 70. The trailer supply valve 92 has a second trailer supply valve port 92.2, which is pneumatically connected to a trailer supply pressure port 96. The trailer supply valve 92 has a third trailer supply valve port 92.3, which is pneumatically connected to the air release line 44.

In a trailer supply position 92A, the first trailer supply valve port 92.1 is pneumatically connected to the second trailer supply valve port 92.2 so as to pneumatically connect the supply pressure path 70 to the trailer supply pressure port 96 in order to supply the trailer supply pressure pVA.

In a trailer air release position 92B, the second trailer supply valve port 92.2 is pneumatically connected to the third trailer supply valve port 92.3 so as to connect the trailer supply pressure port 96 to the air release line 44 for the purpose of releasing air.

The electropneumatic valve assembly 1 has a second pressure sensor 65, which is pneumatically connected to the trailer supply pressure port 96, for measuring the trailer supply pressure pVA.

The trailer pilot unit 94 has in the present case a first trailer pilot valve 97 and a second trailer pilot valve 98. The first trailer pilot valve 97 is in the form of a 2/2-way solenoid valve and is controllable by a first electronic trailer brake signal SBA1. In an open position 97A, the first trailer pilot valve 97 connects the supply pressure path 70 to a trailer control branch 95, which is in turn pneumatically connected to the trailer control port 92.4. By switching the first trailer pilot valve 97 into the open position 97A, the trailer supply valve 92 can thus be switched into the trailer supply position 92A. In a closed position 97B, the first trailer pilot valve 97 is correspondingly closed and the supply pressure path 70 is separated from the trailer control branch 95.

The second trailer pilot valve 98 is controllable by a second electronic trailer brake signal SBA2. The second trailer pilot valve 98 is in the form of a 3/2-way solenoid valve. In a first position 98A, the trailer control branch 95 is pneumatically connected to the air release port 3. In a second position 98B, the trailer control branch 95 is pneumatically connected to the trailer supply pressure port 96 via a throttled connection. In this manner, a self-holding function of the trailer supply valve 92 is advantageously implemented, since the outputted trailer supply pressure pVA is fed back via the second trailer pilot valve 98 in the closed position 98B in a throttled manner to the trailer control port 92.4. In this manner a so-called "tractor protection" functionality can be implemented, in which the supply pressure path 70 at the trailer supply valve 92 is closed by automatic switching into the trailer air release position 92B if the pressure at the trailer supply pressure port 96 falls. An uncontrolled pressure loss via the trailer supply pressure port 96 is thereby advantageously prevented if, for example, the trailer 207 becomes detached from the commercial vehicle 201 in an uncontrolled manner and a pneumatic line connected to the trailer supply pressure port 96 breaks away.

The electropneumatic valve assembly 1 has an electronic control unit 99, which is connected in a signal- and/or energy-carrying manner to the electronic components of the electropneumatic valve assembly 1. In particular, the first pilot valve 41, the second pilot valve 42, the first trailer pilot valve 97 and the second trailer pilot valve 98 are in the present case electrically connected to the electronic control unit 99 for actuation. The first pressure sensor 64 and the second pressure sensor 65 are also electrically connected to the electronic control unit 99.

Figure 2:
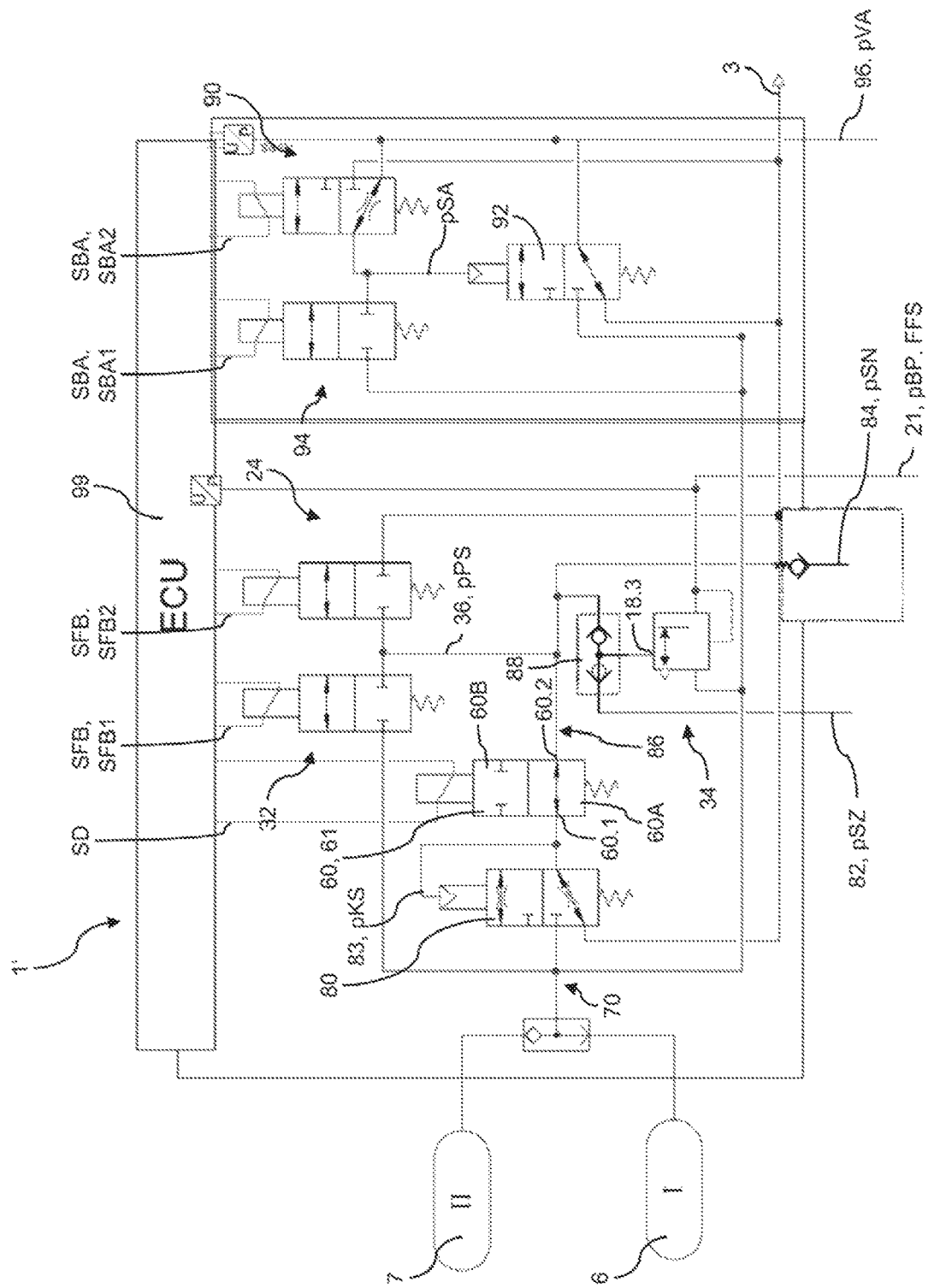
FIG. 2 shows a second embodiment of an electropneumatic valve assembly according to the disclosure.

FIG. 2 shows a second embodiment of an electropneumatic valve assembly 1'. This second embodiment differs from the first embodiment shown in FIG. 1 in that a deactivation valve 60 is additionally arranged in the compensation path 86. The deactivation valve 60 is in the present case in the form of a 2/2-way valve 61 in the form of a solenoid valve. The deactivation valve 60 is arranged between the compensation valve 80 and the control port 18.3. The deactivation valve 60 has a first deactivation valve port 60.1, which is pneumatically connected to the second compensation valve port 80.2. The deactivation valve 60 has a second deactivation valve port 60.2, which is pneumatically connected to the control port 18.3 of the main valve unit 34, in the present case via the control line 36 and the shuttle selection valve 88. In an activation position 60A, the first deactivation valve port 60.1 and the second deactivation valve port 60.2 are pneumatically connected. In a deactivation position 60B, the first deactivation valve port 60.1 and the second deactivation valve port 60.2 are separated. The deactivation valve 60 can be switched via a deactivation valve signal SD, advantageously via the electronic control unit 99.

Via the deactivation valve 60, the functioning of the compensation valve 80 can advantageously be suppressed in a controllable manner. By switching the deactivation valve 60 into the deactivation position 60B, the compensation path 86 is blocked, whereby in particular the control behavior of the pneumatically actuatable main valve 18 is improved because no air can escape at the control port 18.3 via the compensation valve 80. This is advantageous in particular where time-critical control behavior is required, for example in the case of stepped actuation.

Figure 3:
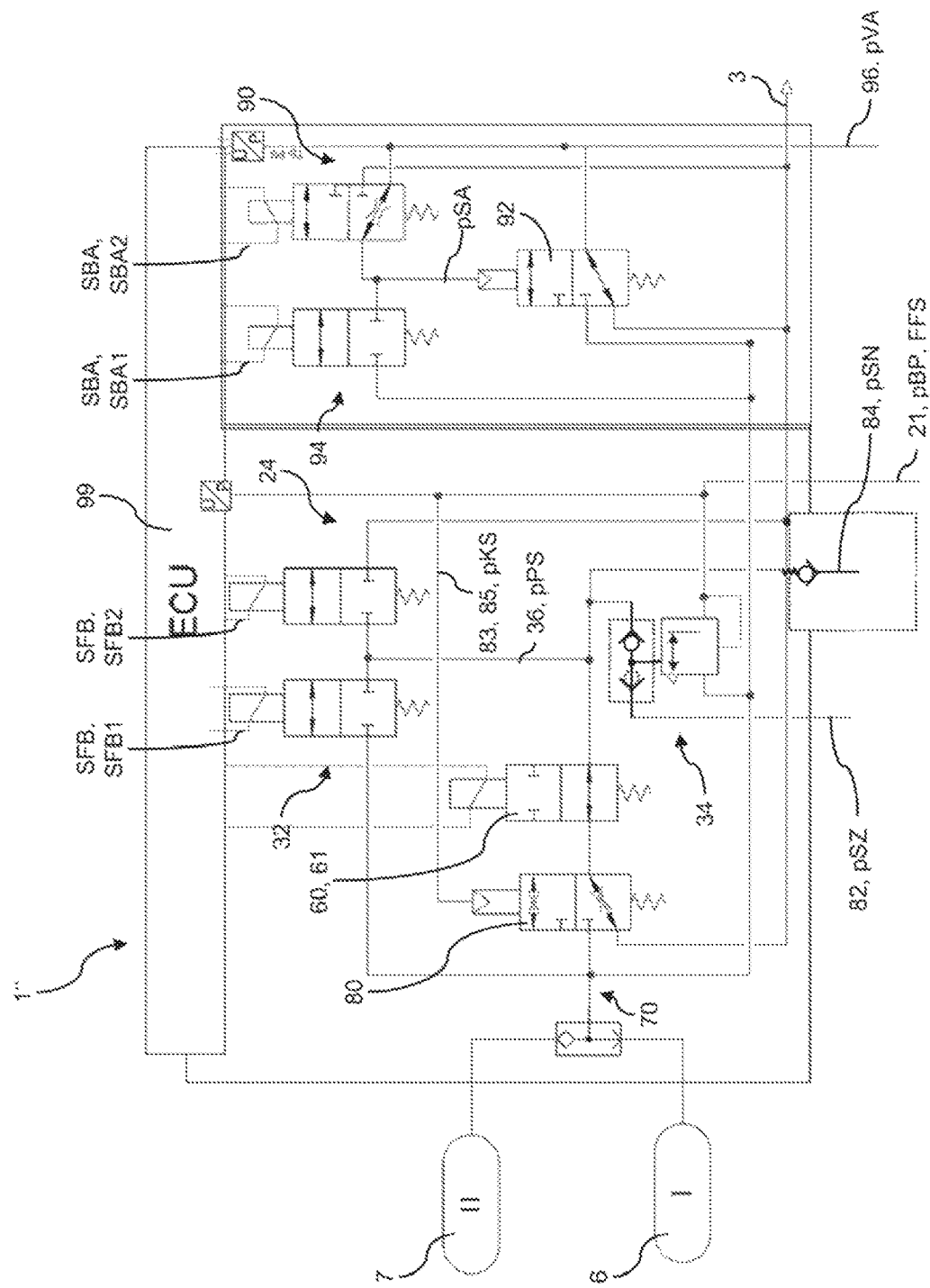
FIG. 3 shows a third embodiment of an electropneumatic valve assembly according to the disclosure; and, FIG. 4 shows an electropneumatic brake system having a valve assembly according to the disclosure.

FIG. 3 shows a third embodiment of an electropneumatic valve assembly 1". This third embodiment differs from the first embodiment shown in FIG. 1 in that the compensation control path 83 is in the form of a feedback path, which pneumatically connects the compensation valve control port 80.4 to the spring brake port 21. Unlike the first and second embodiments shown in FIG. 1 and FIG. 2, the parking brake pressure pBS outputted by the main valve unit 34 and not the parking brake control pressure pPS is in the present case thus provided as the compensation valve control pressure pKS at the compensation valve control port 80.4.

Figure 4:
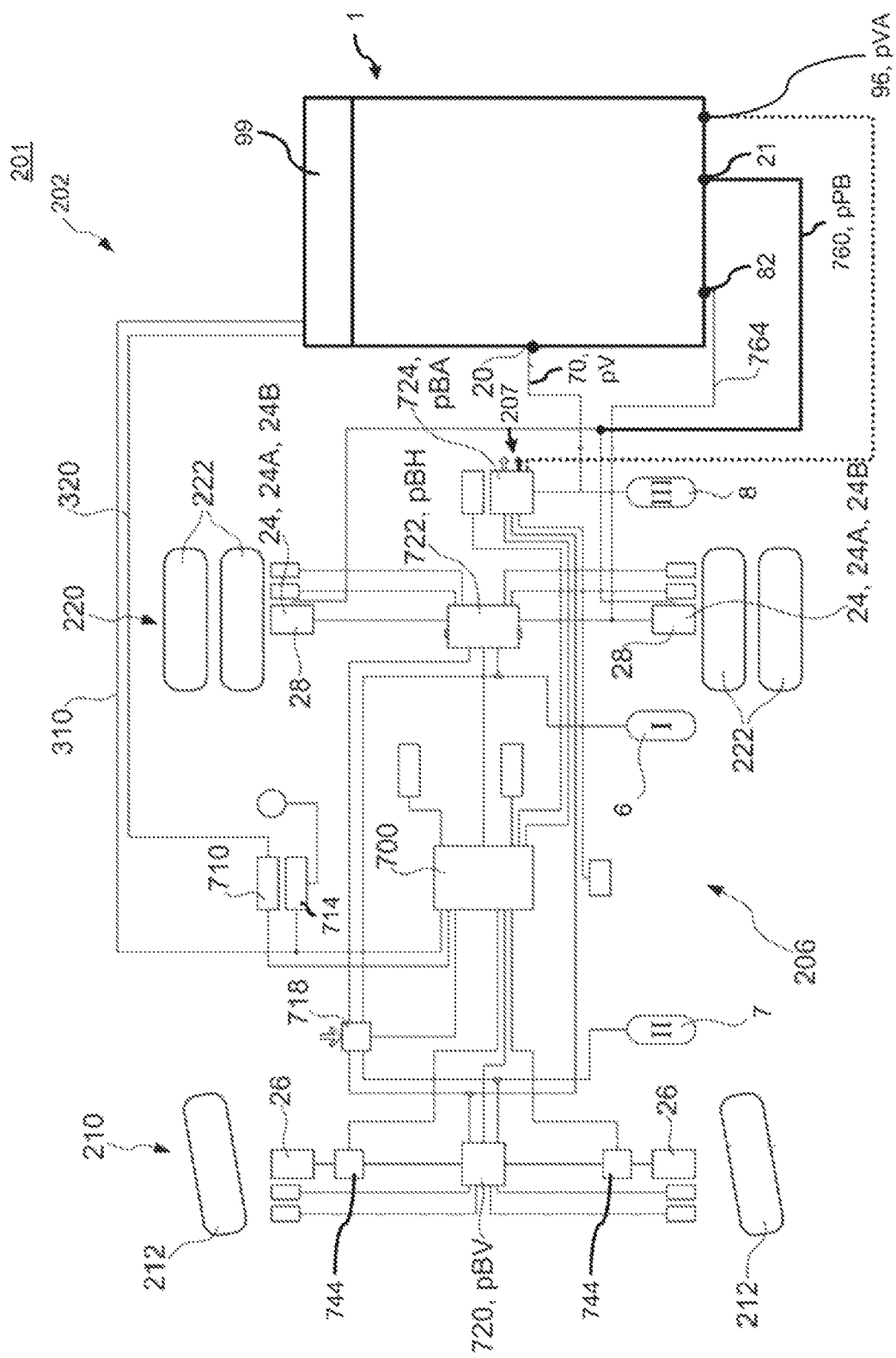

FIG. 4 shows an electropneumatic brake system 202. The electropneumatic brake system 202 is in the present case used in a commercial vehicle 201, which is here shown diagrammatically, in particular with two front wheels 212 of a front axle 210 and four rear wheels 222 of a rear axle 220.

A central control unit 700 is connected in a signal-carrying manner to an electronic control unit 99 of the electropneumatic valve assembly 1 via a central control line 310. The electronic control unit 99 is further supplied with electric power from a power supply 710 via a supply line 320.

Two service brake cylinders 56 of a service brake function FBS, which are each associated with a front wheel 212 of the front axle 210, can be actuated via the front axle modulator 720 for braking actuation. The front axle modulator 720 is in turn connected in a signal-carrying manner to the central control unit 700 in order to receive brake signals, wherein the central control unit 700 is able to receive brake request signals via a vehicle bus 714. Alternatively or additionally, preferably within the context of a fallback level, the service brake function FBS can be actuated via a brake signal transmitter 718. Compressed air from a second compressed air supply 7 is admitted to the service brake cylinders 56 via a front axle modulator 720, in that the front axle modulator 720 provides a front axle brake pressure pBV.

In an analogous manner, two parking brake cylinders 54, which are each associated with the rear wheels 222 of the rear axle 220, can have a service brake chamber 58 which, under the control of the brake signal transmitter 718, can be supplied with compressed air from a first compressed air supply 6 via a rear axle modulator 722 for the purpose of braking. For this purpose, the rear axle modulator 722 provides a rear axle brake pressure pBH.

The brake system 202 further has a trailer control valve 724 for providing a trailer brake pressure pBA, which can be pneumatically connected to a trailer 207 (not shown here) of the commercial vehicle 201—for the purpose of supplying a brake system of the trailer. The trailer control valve 724 advantageously pneumatically connects the trailer supply pressure port 96 to the trailer 207 via a coupling head, of which two are shown diagrammatically as arrows on the trailer control valve 724.

The two parking brake cylinders 54 each have a spring brake and are pneumatically connected via a parking brake line 760 to a parking brake port 21 of the electropneumatic valve assembly 1.

Via the electropneumatic valve assembly 1, a parking brake pressure pBP can be provided to the parking brake cylinders 54 in order in each case to admit air to the parking brake cylinders 54 and thus move them from a braking position 54B into a release position 54A.

The electropneumatic valve assembly 1 is provided with a supply pressure pV, here from a third compressed air supply 8, via a supply pressure path 70. Equally, in other embodiments, the supply pressure path 70 can easily be connected to a different compressed air supply, in particular to the first compressed air supply 6 or to a second compressed air supply 7. Particularly preferably, in some embodiments, two compressed air supplies can be connected to the supply pressure path 70 via a supply shuttle valve 49 as shown in FIG. 1. The electropneumatic valve assembly 1 is advantageously supplied via at least one compressed air supply, the supply pressure of which can purposively be lowered, in particular via a valve of the service brake function FBS. Such a valve can be an ABS valve 744, for example.

Via the rear axle modulator 722, the rear axle brake pressure pBH can be provided as additional control pressure pZ at the anti-compound port 82 via the additional actuation line 764, in particular within the context of an anti-compound function.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1, 1', 1" electropneumatic valve assembly
3 air release port
6 first compressed air supply
7 second compressed air supply
8 third compressed air supply
18 main valve
18.1 supply port of the main valve
18.2 main port of the main valve
18.3 control port of the main valve 20 relay valve
21 spring brake port
24 parking brake valve unit
27 first throttle
28 second throttle
32 pilot valve unit
34 main valve unit
36 control line
41 first pilot valve
41A open position of the first pilot valve
41B closed position of the first pilot valve
42 second pilot valve
42A open position of the second pilot valve
42B closed position of the second pilot valve
44 air release line
49 supply shuttle valve
54 parking brake cylinder
54A release position of the parking brake cylinder
54B braking position of the parking brake cylinder
56 service brake cylinder
58 service brake chamber
60 deactivation valve
60A activation position of the deactivation valve
60B deactivation position of the deactivation valve
60.1 first deactivation valve port
60.2 second deactivation valve port
61 2/2-way valve
64 first pressure sensor
65 second pressure sensor
70 supply pressure path
74 supply branch of the supply pressure path
76 control branch of the supply pressure path
80 compensation valve
80A first switch position of the compensation valve
80B second switch position of the compensation valve
80.1 first compensation valve port
80.2 second compensation valve port
80.3 third compensation valve port
80.4 compensation valve control port
81 3/2-way valve
82 anti-compound port
83 compensation control path
84 emergency release port
85 check valve
86 compensation path
88 selection valve
88.1 first selection valve port
88.2 second selection valve port
88.3 third selection valve port
90 trailer valve unit
92 trailer supply valve
92A trailer supply position
92B trailer air release position
92.1 first trailer supply valve port
92.2 second trailer supply valve port
92.3 third trailer supply valve port
92.4 trailer control port
94 trailer pilot unit
95 trailer control branch
96 trailer supply pressure port
97 first trailer pilot valve
97A open position of the first trailer pilot valve
97B closed position of the first trailer pilot valve
98 second trailer pilot valve
98A first position of the second trailer pilot valve
98B second position of the second trailer pilot valve
99 electronic control unit
201 commercial vehicle
202 electropneumatic brake system
207 trailer
210 front axle
212 front wheel
220 rear axle
222 rear wheel
310 central control line
320 supply line
700 central control unit
710 power supply
714 vehicle bus
718 brake signal transmitter
720 front axle modulator
722 rear axle modulator
724 trailer control valve
744 ABS valve
760 parking brake line
764 additional actuation line
FBS service brake function
FFS parking brake function
pBP parking brake pressure
pKS compensation valve control pressure
pKSS compensation valve threshold value
pPS parking brake control pressure
pSA trailer control pressure
pSN emergency release pressure
pSZ additional parking brake pressure
pV supply pressure
pVA trailer supply pressure
SD deactivation valve signal
SFB parking brake signal
SBA electronic trailer brake signal
SBA1 first electronic trailer brake signal
SBA2 second electronic trailer brake signal
SFB electronic parking brake signal
SFB1 first electronic parking brake signal
SFB2 second electronic parking brake signal

What is claimed is:

1. An electropneumatic valve assembly for actuating a parking brake function of an electropneumatic brake system of a commercial vehicle, the electropneumatic valve assembly comprising:
at least one pressure supply;
a supply pressure path;
a parking brake valve unit receiving supply pressure (pV) from said at least one pressure supply via said supply pressure path;
a pneumatically self-holding trailer valve unit being connected to said supply pressure path for receiving said supply pressure (pV) and having a pneumatically switchable trailer supply valve providing a trailer supply pressure (pVA) to a trailer supply port in dependence upon an electronic trailer braking signal (SBA);
said parking brake valve unit including a pilot valve unit and a main valve unit;
said pilot valve unit being provided to output a parking brake control pressure (pPS) at said main valve unit;
said main valve unit being configured to output a parking brake pressure (pBP) at least at one spring brake port in dependence on said parking brake control pressure (pPS) received from said pilot valve unit; and,
a compensation valve being provided to maintain said parking brake control pressure (pPS) outputted at said main valve unit by said pilot valve unit and so compensate at least partially for a leakage of at least one of the following: said pilot valve unit and said main valve unit.

2. The electropneumatic valve assembly of claim 1, wherein:
said compensation valve is configured as a 3/2-way valve having:
a first compensation valve port for receiving the supply pressure (pV);
a second compensation valve port whereat said parking brake control pressure (pPS) or a pressure derived therefrom can be present; and,
a third compensation valve port connected to an air outlet; and,
said compensation valve being switchable into a first switch position wherein said second compensation valve port is connected to said third compensation valve port and into a second switch position wherein said first compensation valve port is connected to said second compensation valve port.

3. The electropneumatic valve assembly of claim 2, wherein said compensation valve is biased into said first switch position by spring loading and switches into said second switch position in an actuated state.

4. The electropneumatic valve assembly of claim 2, wherein said compensation valve is in the form of a pneumatically switchable valve switchable via a compensation valve control pressure (pKS).

5. The electropneumatic valve assembly of claim 4, wherein said compensation valve is configured to switch when said compensation valve control pressure (pKS) exceeds a compensation valve threshold value (pKSS).

6. The electropneumatic valve assembly of claim 4, wherein said compensation valve control pressure (pKS) is a pressure present or outputted at said second compensation valve port so as to cause pneumatic self-holding for the compensation valve to be implemented.

7. The electropneumatic valve assembly of claim 4, wherein said compensation valve control pressure (pKS) is the parking brake pressure (pBP) present or outputted at said spring brake port.

8. The electropneumatic valve assembly of claim 1, further comprising:
a control line;
a compensation path pneumatically connecting said supply pressure path to said control line;
said compensation valve being arranged in said compensation path; and,
said control line being pneumatically connected to said main valve unit for providing said parking brake control pressure (pPS).

9. The electropneumatic valve assembly of claim 8, further comprising:
a deactivation valve arranged in said compensation path and having first and second deactivation valve ports; and,
said deactivation valve being switchable in dependence on a deactivation signal (SD) from an activation position pneumatically connecting said first deactivation valve port and said second deactivation valve port into a deactivation position pneumatically separating said first deactivation valve port and said second deactivation valve port.

10. The electropneumatic valve assembly of claim 1, further comprising:

a trailer pilot unit for providing a trailer control pressure (pSA) in dependence on said electronic trailer brake signal (SBA); and,
said trailer supply valve being pneumatically actuatable in dependence on a trailer control pressure (pSA).

11. The electropneumatic valve assembly of claim 8, further comprising:
an emergency release port configured to be pneumatically connectable to said control line to provide an emergency release pressure (pSN).

12. An electropneumatic valve assembly for actuating a parking brake function of an electropneumatic brake system of a commercial vehicle, the electropneumatic valve assembly comprising:
at least one pressure supply:
a supply pressure path;
a parking brake valve unit receiving supply pressure (pV) from said at least one pressure supply via said supply pressure path;
a pneumatically self-holding trailer valve unit being connected to said supply pressure path for receiving said supply pressure (pV) and having a pneumatically switchable trailer supply valve providing a trailer supply pressure (pVA) to a trailer supply port in dependence upon an electronic trailer braking signal (SBA);
said parking brake valve unit including a pilot valve unit and a main valve unit;
said pilot valve unit being provided to output a parking brake control pressure (pPS) at said main valve unit;
said main valve unit being configured to output a parking brake pressure (pBP) at least at one spring brake port in dependence on said parking brake control pressure (pPS) received from said pilot valve unit;
a compensation valve being provided to maintain said parking brake control pressure (pPS) outputted at said main valve unit by said pilot valve unit and so compensate at least partially for a leakage of at least one of the following: said pilot valve unit and said main valve unit;
said compensation valve being configured as a 3/2-way valve having:
a first compensation valve port for receiving the supply pressure (pV);
a second compensation valve port whereat said parking brake control pressure (pPS) or a pressure derived therefrom can be present; and,
a third compensation valve port connected to an air outlet;
said compensation valve being switchable into a first switch position wherein said second compensation valve port is connected to said third compensation valve port and into a second switch position wherein said first compensation valve port is connected to said second compensation valve port;
wherein said compensation valve is throttled so as to cause at least one of the following to apply:
i) the connection of said first compensation valve port to said second compensation valve port is throttled; and,
ii) the connection to said second compensation valve port to said third compensation valve port is throttled.

13. An electropneumatic brake system for a commercial vehicle, the electropneumatic brake system comprising:
an electropneumatic valve assembly including:
at least one pressure supply;
a supply pressure path;
a parking brake valve unit receiving supply pressure (pV) from said at least one pressure supply via said supply pressure path;

a pneumatically self-holding trailer valve unit being connected to said supply pressure path for receiving said supply pressure (pV) and having a pneumatically switchable trailer supply valve providing a trailer supply pressure (pVA) to a trailer supply port in dependence upon an electronic trailer braking signal (SBA);

said parking brake valve unit including a pilot valve unit and a main valve unit;

said pilot valve unit being provided to output a parking brake control pressure (pPS) at said main valve unit;

said main valve unit being configured to output a parking brake pressure (pBP) at least at one spring brake port in dependence on said parking brake control pressure (pPS) received from said pilot valve unit; and, a compensation valve being provided to maintain said parking brake control pressure (pPS) outputted at said main valve unit by said pilot valve unit and so compensate at least partially for a leakage of at least one of the following: said pilot valve unit and said main valve unit;

at least a first compressed air supply;

at least one spring brake cylinder pneumatically connected to said at least one spring brake port for receiving the parking brake pressure (pBP); and, an electronic control unit configured to provide at least one electronic parking brake signal (SFB).

14. A commercial vehicle having an electropneumatic valve assembly as claimed in claim 1.

15. A commercial vehicle having an electropneumatic brake system as claimed in claim 13.

* * * * *